United States Patent

Buchheim et al.

[11] Patent Number: 6,115,659
[45] Date of Patent: Sep. 5, 2000

[54] TRIGGERING PROCESS FOR PASSIVE SAFETY DEVICES IN VEHICLES

[75] Inventors: Timm Buchheim, Schwäbisch Hall; Gerhard Schäfer, Weinsberg, both of Germany

[73] Assignee: Temic Telefunken Microelectronic GmbH, Heilbronn, Germany

[21] Appl. No.: 08/855,645

[22] Filed: May 13, 1997

[30] Foreign Application Priority Data

May 14, 1996 [DE] Germany ............... 196 19 412

[51] Int. Cl.[7] ............................ B60R 21/32
[52] U.S. Cl. ................. 701/45; 701/46; 701/47; 180/282; 280/735
[58] Field of Search .............. 701/45, 46, 47; 180/232, 271, 282; 280/734, 735

[56] References Cited

U.S. PATENT DOCUMENTS

| 5,229,943 | 7/1993 | Eigler et al. ............... 701/45 |
| 5,515,276 | 5/1996 | Kura et al. ................ 701/45 |
| 5,608,628 | 3/1997 | Drexler et al. ............. 701/45 |

FOREIGN PATENT DOCUMENTS

| 0311039 | 4/1989 | European Pat. Off. . |
| 0517253 | 12/1992 | European Pat. Off. . |
| 0693404 | 1/1996 | European Pat. Off. . |
| 0709257 | 5/1996 | European Pat. Off. . |
| 2123359 | 1/1972 | Germany . |
| 3001780 | 9/1984 | Germany . |
| 3717427 | 2/1989 | Germany . |
| 3816587 | 11/1989 | Germany . |
| 3816588 | 11/1989 | Germany . |
| 4117811 | 6/1993 | Germany . |
| 4420114 | 12/1995 | Germany . |
| 4424551 | 1/1996 | Germany . |
| 19537546 | 4/1997 | Germany . |
| 90/09298 | 8/1990 | WIPO . |
| 93/09008 | 5/1993 | WIPO . |

Primary Examiner—Tan Q. Nguyen
Attorney, Agent, or Firm—Venable; George H. Spencer; Norman N. Kunitz

[57] ABSTRACT

The invention describes a process for triggering a passive safety device for vehicle occupants inside a vehicle, in particular airbags, pretensioning systems, buckle switches, and roll-over bars, where—by means of electric sensors, an evaluation circuit evaluating the acceleration signals of these sensors, and a triggering agent—an activation of these triggering agents is effected if the acceleration signals indicate a vehicle condition which may be potentially hazardaous for the vehicle occupants. According to the invention, the sensor signals will first be quantified, followed by detection of those signals that indicate simultaneously an impact direction against the direction of vehicle travel. At the same time that such sensor signals are detected, a linearly increasing crash signal as well as a trigger threshold increasing with the clock pulse are generated. If the crash signal reaches this dynamic trigger threshold, the trigger agents will be activated. The process according to the invention will cause an excellent time behavior, that is, it will lead to a very fast ignition of the safety devices in the event of a vehicle crash hazardous to vehicle occupants.

13 Claims, 8 Drawing Sheets

FIG. 1

DIRECTION OF VEHICLE TRAVEL

TRIGGERING PROCESS FOR PASSIVE SAFETY DEVICES IN VEHICLES

BACKGROUND OF THE INVENTION

The invention concerns a process for triggering a passive safety device for vehicle occupants inside a vehicle where—by means of electric sensors that detect a critical vehicle condition, an evaluation circuit, and a triggering agent—an activation of these triggering agents is effected in relation to the acceleration signals generated by the sensors.

Passive safety devices for motor vehicles, such as e.g. airbag systems, pretensioning systems, or roll-over bars, serve to protect vehicle passengers from injuries in the event of a vehicle collision (crash) occurring.

Known triggering processes of such safety devices will feed the acceleration signals, which are generated either by a single or even by two acceleration sensors, into integration in order to compare then the integration value with a crash threshold, and subsequently trigger the passive safety device if necessary.

Before acceleration signals are integrated these will usually be amplified, filtered, and fed to an unsymmetrical limiter as known from DE 38 16 587 A1. By means of a differential circuit a reference value will be subtracted from any signal generated in this way; and only then will it be fed into an integrator. Further processing of the integrated acceleration signal is effected by means of analog technology.

In addition to the analog processing of acceleration signals, their digital processing is also known, for example from DE 37 17 427. There, the acceleration signals of two sensors will be fed into a sample and hold circuit after amplification and filtering; the output signals of such a sample and hold circuit are digitized by means of a post-connected A/D converter. These digitized sensor signals are then processed by a microprocessor.

Such digital processing is also known from DE 30 01 780 C2 where the acceleration signals are converted by means of an 8 bit analog/digital converter and processed by an 8 bit processor.

The cost and effort entailed by such 8 bit processing is not inconsiderable as it involves a very high memory storage and calculation requirement.

Finally, from DE 41 17 811 C2, a process for evaluating sensor signals is known where these signals are first digitized as acceleration signals. These digitized acceleration signals will be entered over a predefined time period in succeeding time intervals and stored within a shift register. The difference calculated from the current acceleration value and the previous acceleration value lying in the past by the said predefined time period will then be fed into an integrator in order to calculate the differential velocity whose value is used as a trigger criterion. However, in order to implement storage and difference calculation an 8 bit resolution will be required here also.

SUMMARY OF THE INVENTION

The object of the invention is to provide a process of the type described above which requires only a narrow bit width for processing the acceleration signals and which can therefore be implemented with low software and hardware requirements.

According to the invention the sensor signals supplied by the acceleration sensors will be quantified by comparing the values of these acceleration signals to threshold values and then detecting those sensor signals that simultaneously indicate an impact direction opposite to the direction in which the vehicle is traveling. The detection of such successive sensor signals within a time sequence will generate an increasing crash signal on the one hand, and, on the other hand, a trigger threshold which increases ever more strongly as time progresses, and, in fact, preferably increases exponentially, with trigger agents being activated as soon as the crash signal reaches this dynamic trigger threshold.

In the event of a crash the process according to this invention will cause a fast activation in time so that there will be no time delay relative to the required trigger point in time following the start of the crash event.

The process according to this invention allows a low cost technical circuit implementation. In particular, following quantification, digital processing of the sensor signals is an option here as, for example, when two sensors complete with two thresholds are used for quantification a maximum of 4 bits only need to be processed together. This low bit width is made possible by the large input quantification so that the dynamic trigger threshold can also be generated by digital means. In addition, implementation of the process steps following quantification may also be effected by means of an existing processor or an additional mini-processor (4 bit).

In a preferred embodiment the generation of the dynamic trigger threshold will be formed additively from a constant value and a count value increasing with the time pulse of the time pattern. Advantageously, the trigger threshold may be set such that it is small at the beginning and then increases exponentially in line with the specified time pattern. In this way it is ensured that immediately before the start of a crash event there exists a high sensitivity for the activation of the trigger agents in respect of the safety devices.

In order to ensure optimum triggering behavior, it is possible to select and determine in relation to the vehicle signature the time pulse of the time pattern for adjusting the exponential course of the trigger threshold as well as the constant value of the trigger threshold.

After they have been quantified, the sensor signals—in a further advantageous embodiment of the invention—will be buffered during a time pulse in order to ensure subsequent processing of these signal-defined states.

In order to improve the classification characteristics of the process according to the invention, a further advantageous application of the invention provides for subjecting the quantified sensor signals to an evaluation function for generating sensor signal characteristics. Subsequently, these sensor signal characteristics will be differentiated and their amounts up-integrated. These up-integrated amounts will be compared with a trigger threshold and, if necessary, the trigger agents of the safety devices will then be triggered.

Preferably, adding the quantified sensor signals can be effected as an evaluation function. However, instead of such adding it is also possible to provide for an evaluation matrix to be used as an evaluation function; this is done by allocating a matrix value to the quantified sensor signals generated with each time pulse.

It is particularly advantageous to implement sensor signal quantification with a positive and a negative threshold; that is why this additional process can be implemented with a low bit width.

A device for implementing the process according to the invention comprises two sensors arranged such in the vehicle that their sensitivity axes are located at an angle of +45° or −45° against the longitudinal axis of the vehicle in the direction of travel.

For quantifying the sensor signals generated by such sensors two quantification comparators each will be allocated that detect a negative or positive threshold value respectively. Furthermore, for detecting such acceleration signals that indicate an impact direction against the direction of travel, a comparator will be used which then generates an output signal if the quantified sensor signals of a time pulse together show positive signs.

In an advantageous further application of such a device the crash signal will be implemented by means of a counter unit post-connected to the comparator such that with successive output signals of the comparator this counter unit counts up.

However, the increasing trigger threshold will be implemented by means of a function unit that is operated as a shift register as well as a counter unit. An adding stage will be post-connected to this function unit in which a constant value and a time-dependent counter value will be added up as a dynamic trigger threshold. The associated shift or counter pulse is generated by a divider stage.

BRIEF DESCRIPTION OF THE DRAWINGS

The process according to the invention is to be illustrated and elucidated by means of embodiments in connection with the drawings. The figures show:

FIG. 1 A block circuit diagram for an airbag control unit as an embodiment of the process according to the invention, FIG. 2 a circuit layout for evaluation unit 1 according to FIG. 1, FIG. 3 an illustration of the sensors as they are arranged in the vehicle, FIG. 4 an evaluation unit 1 according to FIG. 1 built up by means of a processor, FIG. 5 a program flow chart for implementing the process according to the invention by means of a processor according to FIG. 4, FIG. 6 a signal diagram for describing the process according to the invention, FIG. 7 a block circuit diagram of a further embodiment for implementing the process according to the invention, FIG. 8 a program flow chart for software implementation of the circuit layout function according to FIG. 7, FIG. 9 a part illustration of the circuit layout according to FIG. 7 complete with an evaluation matrix instead of the adding stage 17, and FIGS. 10a and 10b embodiments of an evaluation matrix serving as an evaluation function.

DESCRIPTION OF THE PREFERRED EMBODIMENTS

Figures 1, 3:
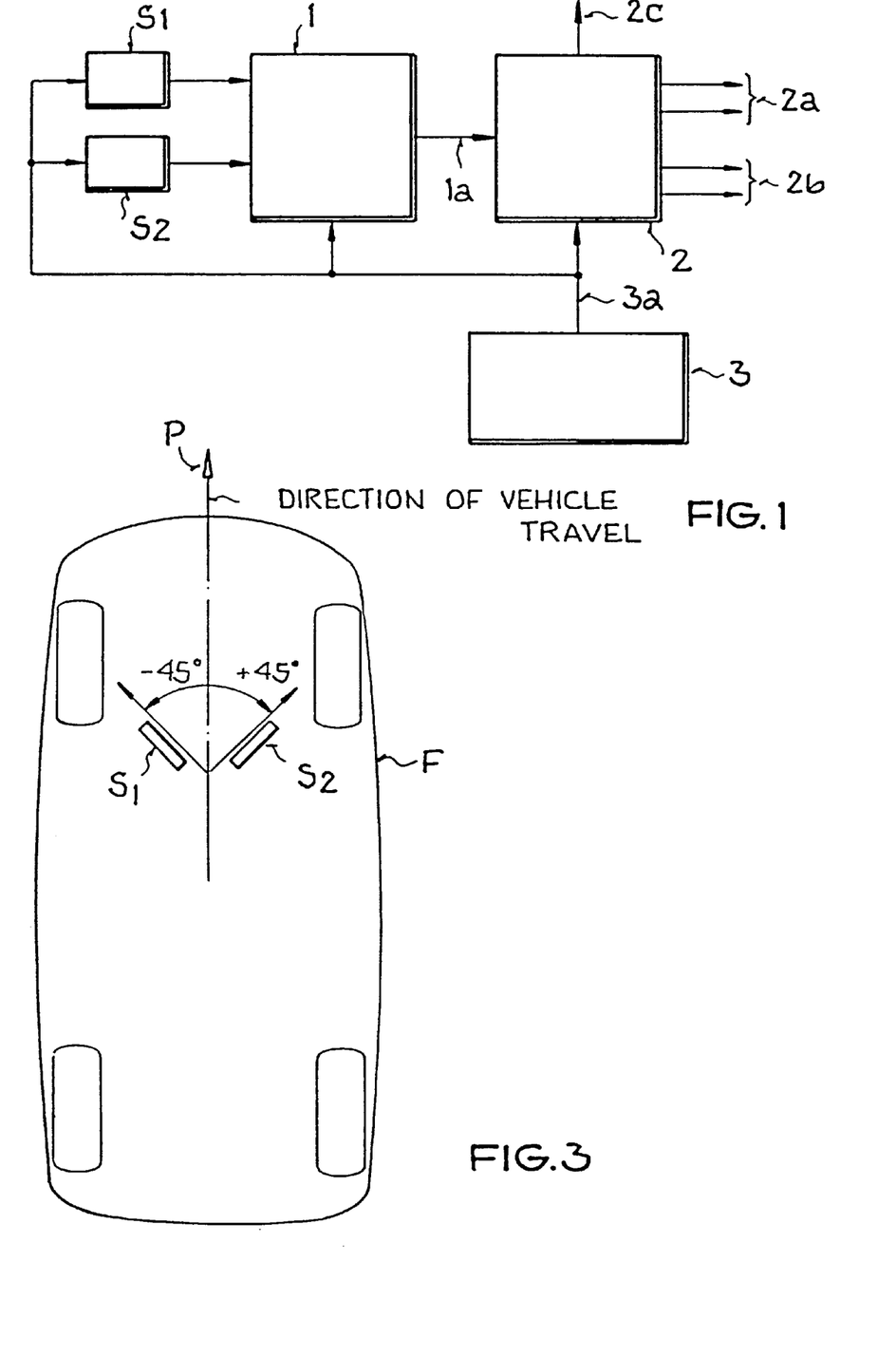

FIG. 1 shows an airbag control unit for motor vehicles complete with function blocks evaluation unit 1, power unit 2, and a diagnosis computer 3. The acceleration signals supplied by two acceleration sensors S1 and S2 are fed into evaluation unit 1 for evaluation; based on these sensor signals, evaluation unit 1 will determine the vehicle state. If these acceleration signals indicate an impending vehicle crash, ignition commands will be passed via line 1a to power unit 2. If it receives ignition commands, this power unit will generate ignition signals for the trigger agents of airbags 2b, pretensioning system 2a, and buckle switch 2c. The diagnosis computer 3 monitors and checks the functionality of the entire system.

According to FIG. 3 the sensors S1 and S2 are offset against each other by 90°, and, respectively, by 45° against the direction of travel P in vehicle F, so that the sensor signals also provide information with regard to the direction of impact.

Figure 2:
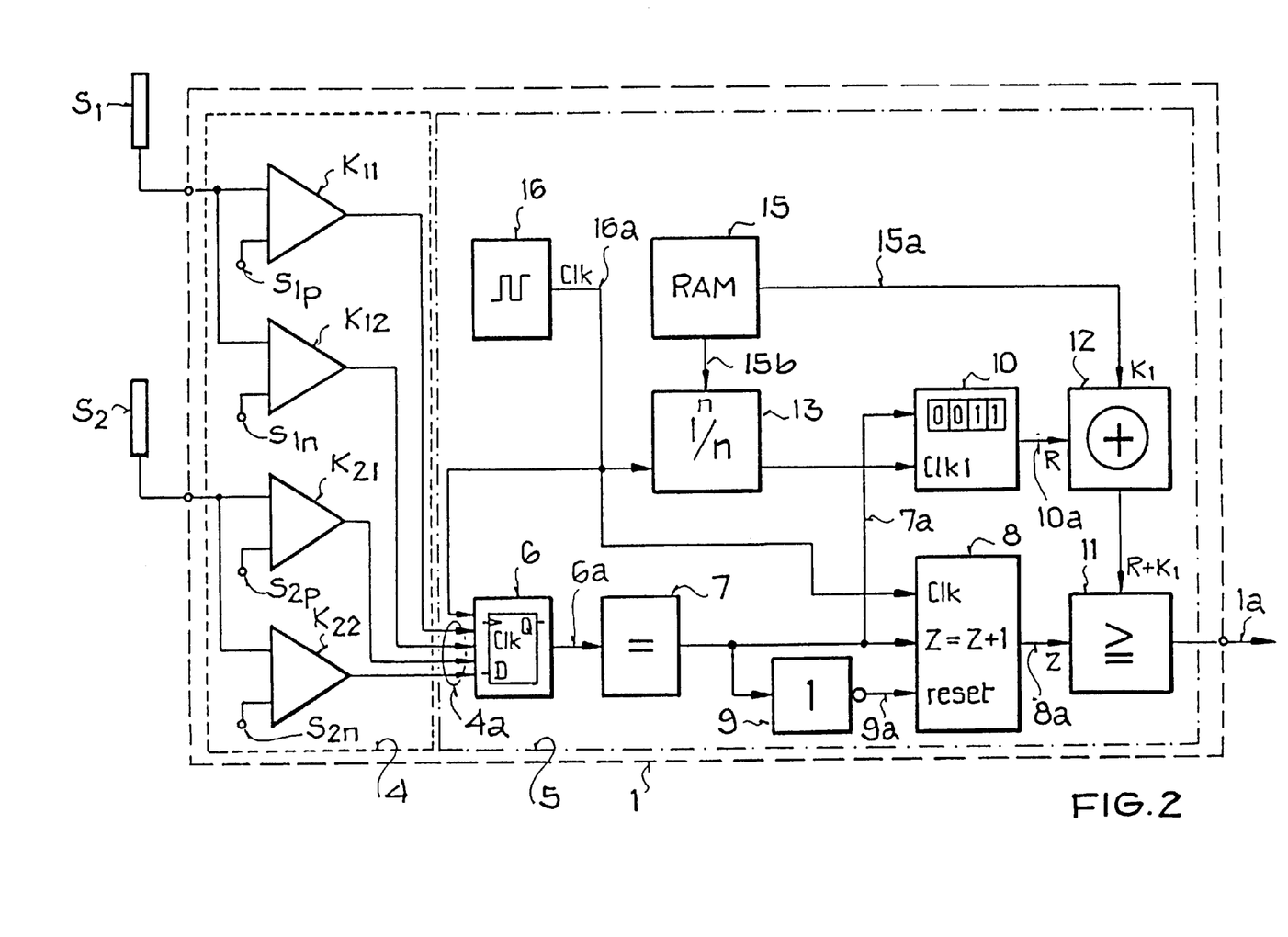

A hardware implementation of evaluation unit 1 according to FIG. 1 is shown in FIG. 2 and comprises a quantification unit 4 and an evaluation circuit 5.

For quantifying the sensor signals the acceleration signal of sensor S1 will be fed respectively into two comparators K11 and K12, and the sensor signals of sensor S2 into two further comparators K21 and K22. A positive and a negative threshold s1n, s1p or s2n, s2p are used as thresholds for quantification:

sensor $S1$ :$s1p$ and $s1n$ where $s1p>s1n$, sensor $S2$: $s2p$ and $s2n$ where $s2p>s2n$.

The output of quantification unit 4 thus has 4 lines 4a that are applied to the input of an intermediate storage device 6 designed with D flip flops.

On each of these lines the information types "no acceleration", "positive acceleration" or "negative acceleration" are available for each sensor S1 or S2. Thus, on 4 lines, there are only 6 different types of information that are buffered by means of intermediate storage device 6 at constant time periods defined by a clock pulse signal clk. To this end, the clock pulse signal clk generated by a clock pulse generator 16 is fed into this intermediate storage 6 via a line 16a, so that the sensor values are applied at its output until the next clock pulse occurs and are thus available at the same time, via a line 6a, at the input of a post-connected comparator 7.

This comparator 7 is used to check whether the sensor values—as present and quantified in each time pulse—of sensors S1 and S2 are positive (that is, whether they indicate an impact direction against the direction of vehicle travel). If this is the case, a start impulse is fed via a line 7a into a counter 8 as well as into a function unit 10 that can be operated either as a shift register or as a counter. At the same time this start impulse is applied to a NAND gate 9 which, on receiving an appropriate input signal, generates a reset signal for counter 8 via a line 9a.

With regard to this counter 8, such a start signal has the effect that its counter state Z is increased by "1". In the other case, that is, if both sensor values are not positive, the counter will be reset to "0". In this way, this counter 8 counts those sensor value pairs which successively indicate an acceleration in a positive direction, that is, which fall into the first quadrant.

The counter state Z of this counter 8 now serves as a crash signal and is fed via a line 8a into a further comparator 11 which effects a comparison with the dynamic trigger threshold (R+K1). If this trigger threshold (R+K1) is exceeded by the crash signal Z, the trigger agents of the safety devices will be activated.

This shiftable trigger threshold (R+K1) is generated within an adding stage 12 by adding a count value R coming via a line 10a from function unit 10 and increasing in line with the clock pulse to a start value K1 entered via a line 15a of a RAM register 15.

In order to allow trigger threshold (R+K1) to increase exponentially the count value R generated by function unit 10 must increase exponentially in line with the clock pulse. This is implemented in combination with a divider stage 13 which, via a line 15b, receives a divider factor n from RAM register 15 as well as, simultaneously, the clock pulse signal clk. This generates a clock pulse signal clk1 with a lower comparative clock frequency than clock pulse signal clk. By means of divider factor n the increase of the exponential trigger threshold can be varied and thus adapted to the vehicle signature.

Below, the task of function unit 10 is to be further described and explained. Initially, it is assumed that its register content is "0". A start impulse generated by comparator 7 now causes a "1" to be written at the bit-lowest point which from this point in time onwards will be shifted to the left at each clock pulse signal clk1 generated by means of divider stage 13, with a "1" being inserted at the same time. This continues until the highest-value bit position has been set. At this time there will be an automatic switchover from the "shift register" function to the "counting down" function. Now register content R can be counted down to "0", if necessary. As soon as the highest value bit extinguishes during such a countdown (that is, as soon as the highest value bit position is "0"), an impulse generated by the comparator 7 will again be taken into account so that it is possible to switch over again to the "shift register" function.

At first, in the "shift register" function, only small values R="1" and R–"11" will be output during the initial time pulses whilst with progressing time pulse the values R will rapidly increase: R="111" and R="1111". However, counting down is effected on a bit by bit basis and thus considerably slower. The result is that a specified time period needs to expire before the process (that is, switchover to the "shift register" function) can be re-activated.

Figure 4:
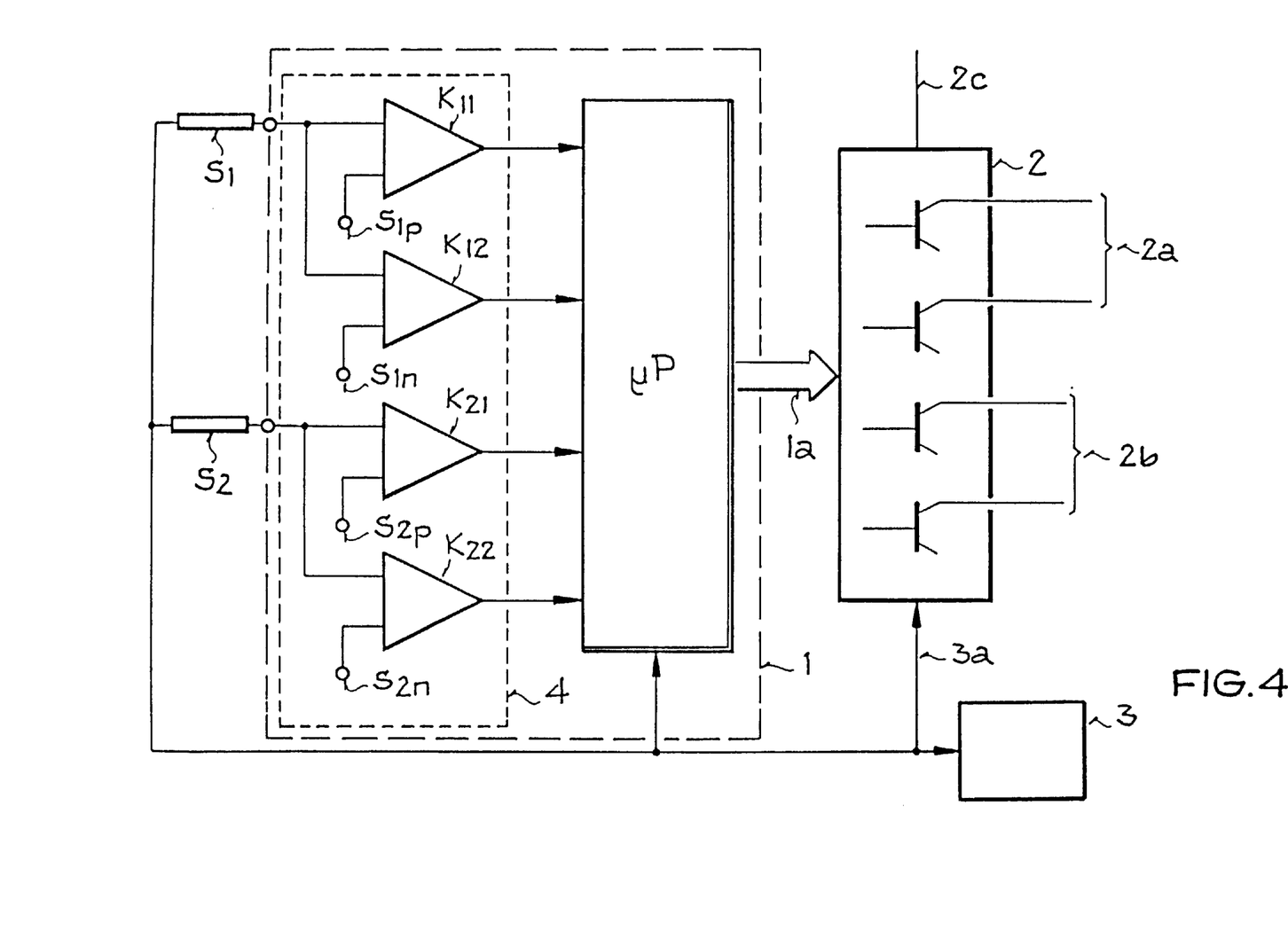

Instead of a hardware implementation of the process according to the invention, sensor signals can also be evaluated by means of a simple 4 bit processor. As shown in FIG. 4, evaluation unit 1 thus comprises a quantification unit 4 and a microprocessor μP. The other function units correspond to those from FIG. 1. Following the start of the program according to FIG. 5, a counter function Z, a divider function n, and a register content R will be set to "0" in step 1. The meaning of functions Z and R has already been described in connection with the explanation relative to FIG. 2. In step 2 start value K1 is set whose meaning has also been further explained in connection with FIG. 2.

Figure 5:
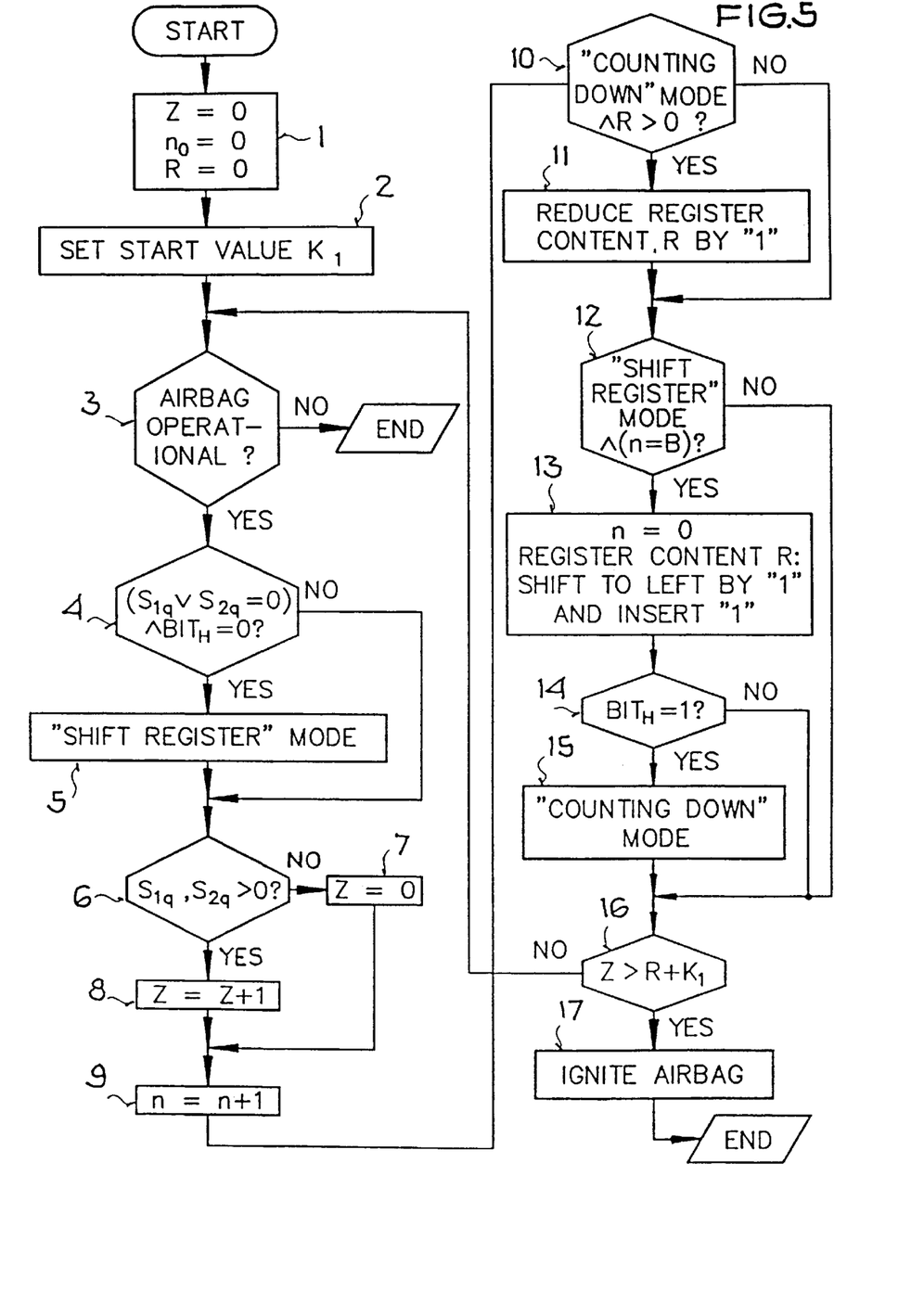

If the safety devices are operational (compare step 3), it will be checked in a step 4 whether one of the sensor signals S1 or S2 is "0" and the highest-value bit position $Bit_H$, is set. If this is the case, the operating mode "shift register" will be activated according to step 5. In any other case, this step 5 will be skipped.

If, according to step 6, both quantified sensor signals S1q and S2q are positive, the counter function Z will subsequently be increased by "1". If this is not the case, the counter will be reset to "0", and only step 9 will be carried out. The divider will be increased from n to n+1 as often as is necessary to reach an upper limit (step 12). When this limit is reached there will be a shift operation at register R and the divider n will be reset to zero (step 13).

There will be a check in step 10 as to whether a register content (R>0) exists in operating mode "counting down". If this is the case, register content R will be decreased by "1", otherwise this step 11 will be skipped.

However, if the operating mode "shift register" exists according to step 12 and the counter n has reached a threshold B, then the divider n will be reset to "0" and the register content R will increased by "1, whilst at the same time another "1" value is post-shifted (compare step no. 13). Threshold B will be selected such that the value in register R changes exponentially over time in an adapted fashion relative to the vehicle type. If the highest-value bit position is set ($Bit_h$=1), the operating mode "counting down" will be set according to step 15, in any other case step 15 will be skipped in order to proceed with the next step 16.

If, however, the operating mode "shift register" (compare step 12) does not exist or if n<B, then the sum of register content R and start value K1 is calculated in step 16, which sum now represents the trigger threshold, and compared to counter state Z. If this trigger threshold is exceeded, the safety devices will be triggered (compare step 17); in any other case there will be a return to step 3.

Figure 6:
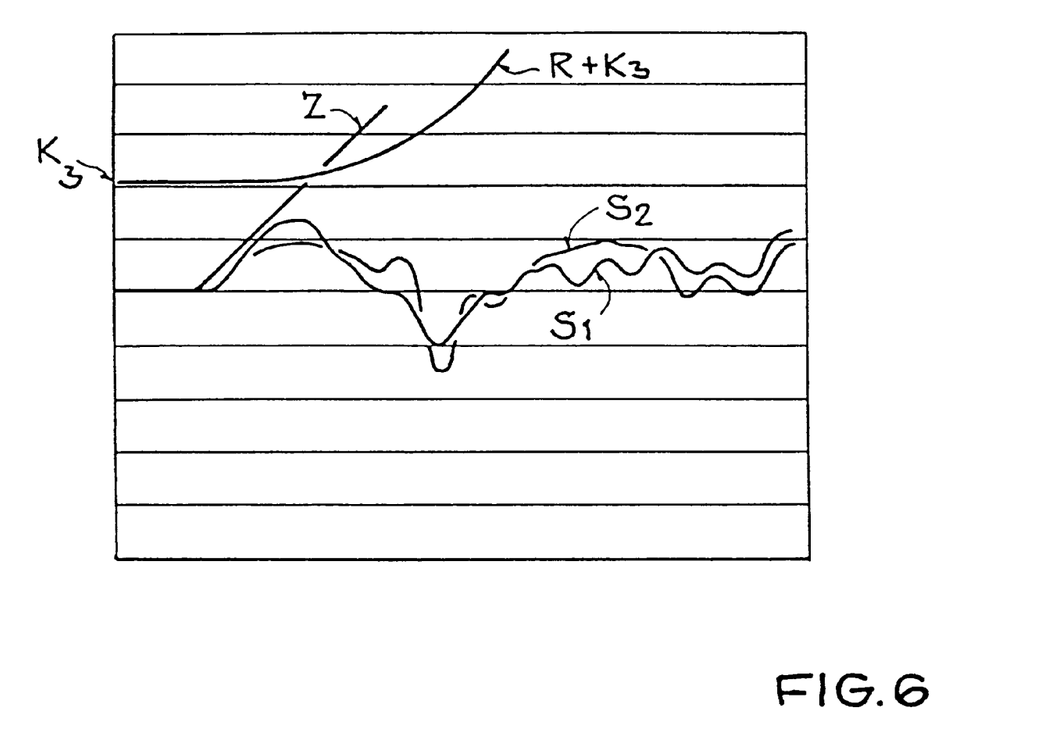

The diagram according to FIG. 6 shows the operating mode of this evaluation procedure. The curves S1 and S2 indicate the course of the acceleration signals of sensors S1 and S2 during a crash event. At the start of the crash event both sensor signals simultaneously have positive values so that crash signal Z increases linearly, whilst at the same time the trigger threshold (R+K1) is generated. At the point where these two curves Z and (R+K1) intersect, the safety devices will trigger.

This process according to the invention ensures an excellent time behavior, that is, a very fast ignition in the event of a crash.

In order to improve the classification behavior, the quantified sensor signals $S_{1q}$ and $S_{2q}$ can be subjected to an evaluation for generating sensor signal characteristics that are used to derive a crash signal.

Figure 7:
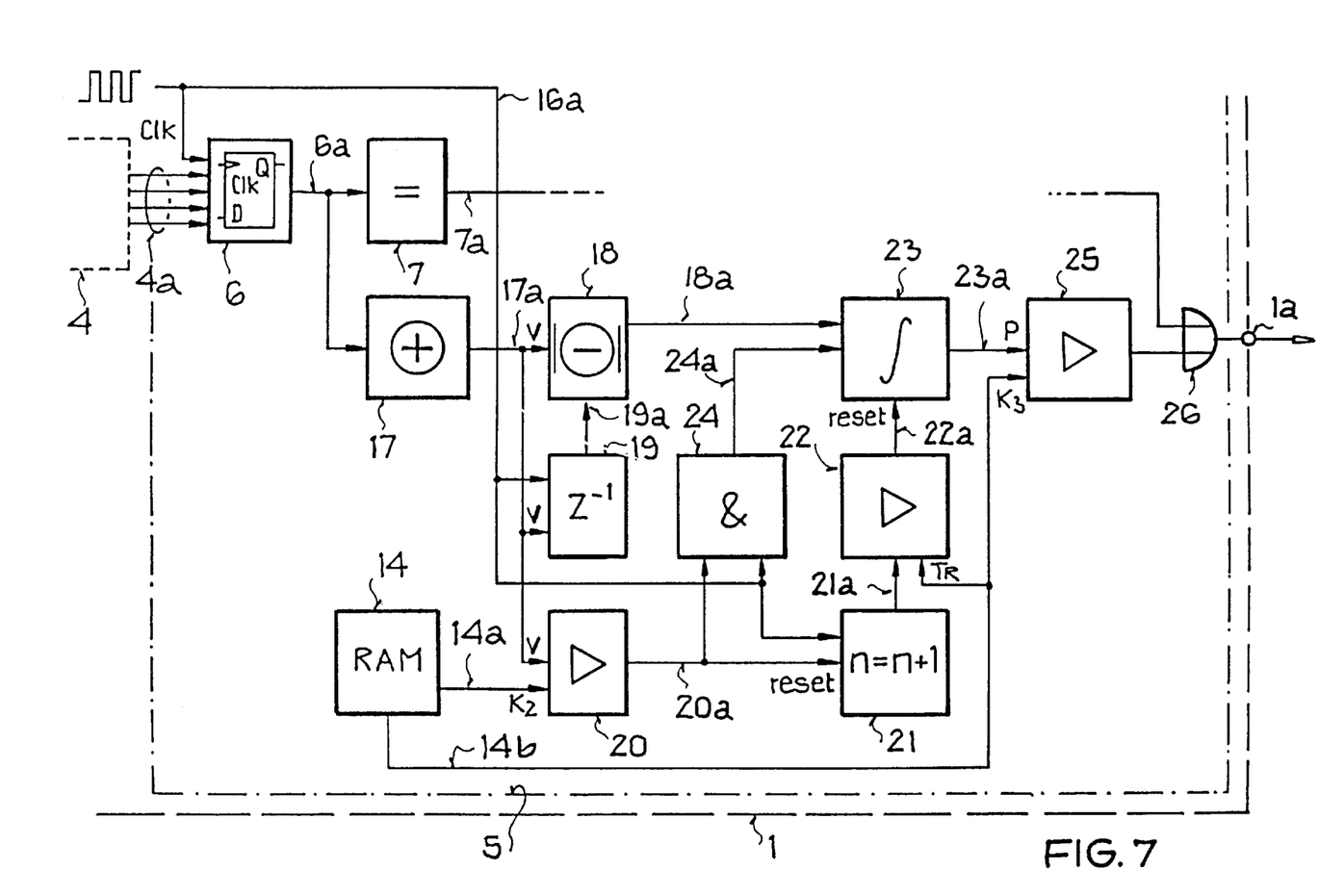

FIG. 7 illustrates a hardware implementation of such an evaluation, with only a section of the circuit layout according to FIG. 2 being shown.

In this circuit layout, the quantified sensor signals $S_{1q}$ and $S_{2q}$ applied to the output of intermediate storage device 6 will be fed not only to comparator 7 but also, via a line 6a, to an adding stage 17. In this adding stage 17, the quantified sensor signals will be added up such that their sum, for each clock pulse, is available at the output of the adding stage 17 as a 3 bit vector, which sum is then fed via a line 17a to post-connected processing units.

This addition represents an evaluation function which is applied to the quantified sensor signals in order to generate with each clock pulse a sensor signal characteristic, that is, the sum. By way of example, the truth table of such an evaluation function for the two sensors S1 and S2 is to be shown below, with the sensitivity axes of these two sensors being arranged according to FIG. 3. Thus sensor S1—viewed in the direction of vehicle travel—can be designated as a left-hand sensor, and the sensor S2 can be designated as a right-hand sensor.

| | left-hand sensor S1 | | right-hand sensor S2 | | output adding stage 17 | |
|---|---|---|---|---|---|---|
| | s1p | s1n | s2p | s2n | vector V | dec |
| 1 | 0 | 0 | 0 | 0 | (0,0,0) | 0 |
| 2 | 1 | 0 | 0 | 0 | (0,0,1) | +1 |
| 3 | 0 | 1 | 0 | 0 | (1,0,1) | −1 |
| 4 | 0 | 0 | 1 | 0 | (0,0,1) | +1 |
| 5 | 1 | 0 | 1 | 0 | (0,1,0) | +2 |
| 6 | 0 | 1 | 1 | 0 | (0,0,0) | 0 |
| 7 | 0 | 0 | 0 | 1 | (1,0,1) | −1 |
| 8 | 1 | 0 | 0 | 1 | (0,0,0) | 0 |
| 9 | 0 | 1 | 0 | 1 | (1,1,0) | −2 |

In the columns "left-hand sensor" and "right-hand sensor" this truth table contains the values generated by quantification unit 4. Here, the value "0" indicates that the relevant threshold value was not reached, whilst the value "1" indicates that the relevant threshold has been reached. Thus, "0" signifies that there is neither a positive r a negative acceleration whilst a "1" indicates a positive or negative acceleration.

In the column "output adding stage 17", located next to the above-described columns, e results of the addition are entered as a 3 bit vector V. Finally, the last column is provided for the relevant decimal value.

As can be seen from this truth table, the evaluation function is defined such that the direction information contained in the sensor signals is essentially lost. Thus the sensor signals received in the event of a vehicle crash involving a front left or front right impact are evaluated as (+1) (see lines 2 and 4) whilst for a corresponding crash involving a left rear or a right rear impact the evaluation is (−1) (see lines 3 and 7).

According to lines 5 and 9, a crash in the direction of travel or against the direction of travel will be evaluated by (+2 or −2).

In all other cases—that is, when the specified thresholds are not reached, —a 0 vector Is output by adding stage 17 In the event of a vehicle crash involving an impact from right or left (compare line 6 or line 8).

These vectors V output by adding stage 17 will be fed via the line 17a into a comparator 20, a register 19, and a function unit 18 which calculates the difference and its amount from the vector V currently fed in and a vector $V_0$ generated during the preceding clock pulse. This vector $V_0$ is stored in register 19 and will be fed to function unit 18, via a line 19a, in accordance with the clock pulse.

The operation carried out in function unit 18 corresponds to a differentiation followed by subsequent addition of the sum of quantified sensor values; thus the amount of the increase of successive sum values is applied at line 18a which leads to an integrator 23.

In this integrator 23, the increase values calculated in successive clock pulses will be added tip and then form a crash signal P which is compared to a trigger threshold K3 in a post-connected comparator 25. If this trigger threshold K3 is reached by crash signal P, the safety devices will be triggered by means of a post-connected OR gate 26. In such a case, the one input of OR gate 26 is fed the crash signal P, and the other input is fed the crash signal generated by comparator 11 according to FIG. 2.

As only positive values are fed to integrator 23, the integrator content would always continue to increase monotonously; this would cause undesirable results to appear. Therefore, this integrator 23 must be reset at specified points in time; this is effected by means of the above-mentioned comparator 20, a counter 21, and a further comparator 22.

Initially, this integrator 23 is to be reset whenever there is no trigger event within a predefined time period. To this end, the counter value generated by counter 21 will be compared, by means of comparator 22, with a time constant $T_R$ provided by a register RAM 14 via a line 14b. If the counter value fed to comparator 12 via a line 21a exceeds this time constant $T_R$, a reset impulse will be fed to integrator 23 via a line 22a.

The reset input of counter 21 is connected with the output of comparator 20 which comparator, via a line 20a, feeds its output signals also to an AND gate 24 that simultaneously receives clock pulse signal clk. The clock pulse signal clk will thus be released for the integrator 23 only if there is an output signal provided by comparator 20.

An output signal will be generated by comparator 20 if a vector generated by the adding stage 17 exceeds a counting threshold K2. This counting threshold K2 is provided—via a line 14a—by the register RAM 14.

By way of example, the truth table of such a comparator 20 is to be shown below.

| vector V | output comparator 20 |
|---|---|
| (0,0,0) | 0 |
| (0,0,1) | 1 |
| (0,1,0) | 1 |
| (1,0,1) | 0 |
| (1,1 0) | 0 |

This shows that comparator 20 generates an output signal only for the vectors (0, 0, 1) and (0, 1, 0); that is, only if a crash involving a front left or front right impact or a frontal impact in the direction of travel is to be expected. In such a case counter 21 will be reset to "0" and also causes integrator 23 to be reset if the crash signal P generated by integrator 23 does not reach the trigger threshold K3 within the time constant $T_R$. This trigger threshold K3 is also stored in register RAM 14.

In all other cases of crash events no output signal is generated so that the increase values determined by these vectors V are not up-integrated within integrator 23 as the clock signal clk does not reach the integrator 23.

The two constants K2 and $T_R$ must have been made consistent with each other and will be determined by means of the crash data existing for each vehicle type. Here, these constants must be selected such that a trigger event is forced to occur whenever this is required, i.e. erroneous trigger events must not occur. The process implemented by the circuit layout according to FIG. 7 meets these conditions using appropriately selected constants K2 and $T_R$, and in this way classifies all crash events fully (100%), where any ignition delay times that may possibly occur due to the characteristics of the circuit layout according to FIG. 2, which is connected in parallel, are negligible. As the point in time at which the safety devices are triggered must occur within a specified time period following detection of a dangerous crash situation by the sensors, the ignition delay time indicates that time interval which exceeds the aforesaid specified time period.

Instead of a hardware implementation this additional evaluation of sensor signals can also be carried out by means of a simple 4 bit processor.

Figure 8:
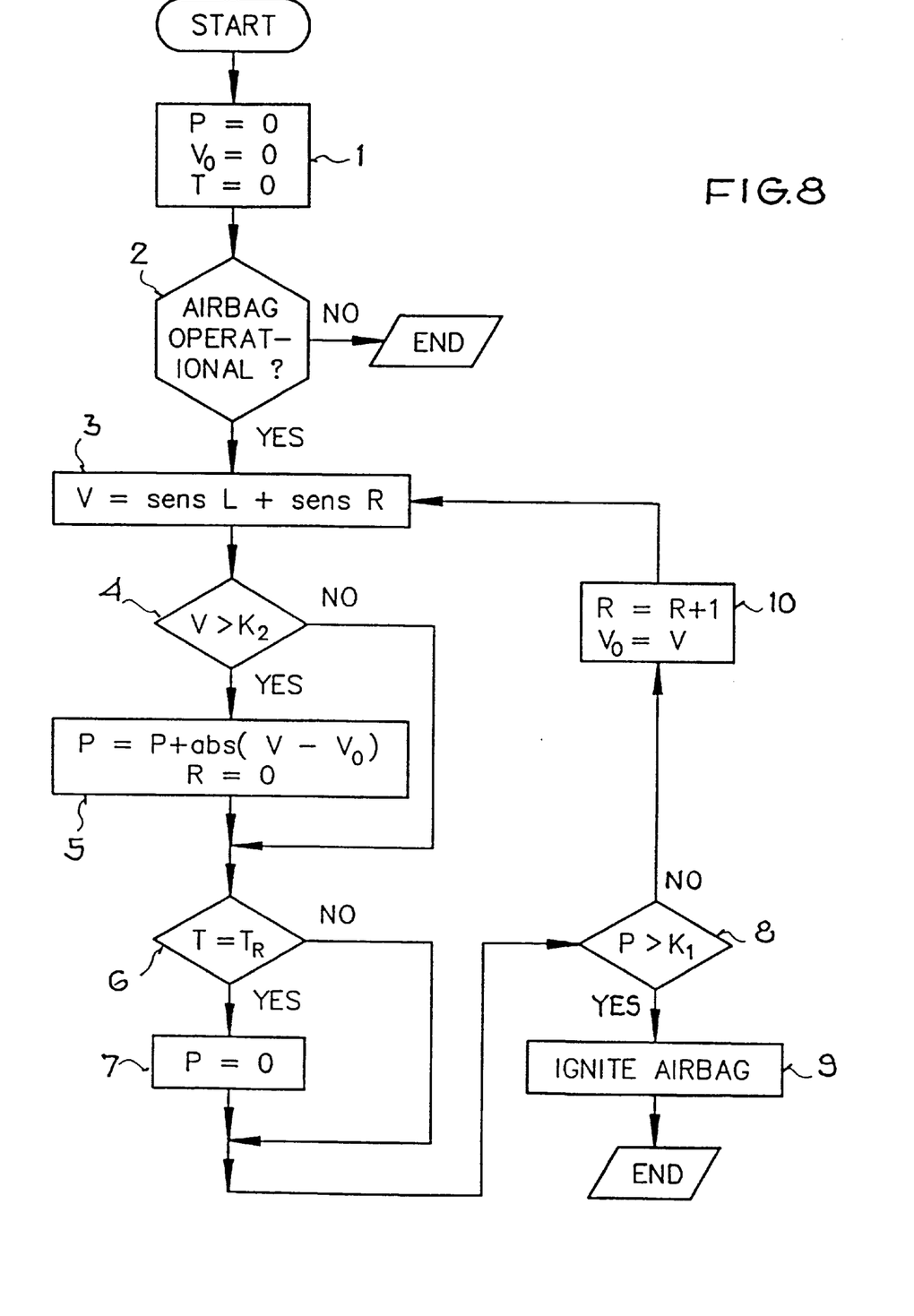

A software implementation provided for such a microprocessor μP is shown by the program flow chart according to FIG. 8. Following the start of the program, the program variables P, $V_0$, and T are initialized in step 1. Here, P represents the value of the up-integrated values of the increase amounts, $V_0$ is the vector from a preceding clock pulse, belonging to a vector V, and T indicates the clock pulse.

If it is known in step 2 that the airbag is operational, the sum of the quantified sensor signals sens L (by the left-hand sensor) and sens R (by the right-hand sensor) is calculated as vector V. Subsequently, in step 4, this vector V is compared with counting threshold K2 whose signification has already been described in connection with FIG. 7. If vector V exceeds this constant K2, then the absolute amount of the difference between this vector V and the vector $V_0$ that was calculated during the preceding clock pulse will be calculated and up-integrated according to the formula stated, that is, it will be added to the preceding integrator value P. At the same time, clock pulse T will also be set to "0". In any other case, this step 5 will be skipped, and immediately followed by step 6 where the clock pulse will be compared with time constant $T_R$ whose signification has also been described already in connection with FIG. 7. If the clock pulse T reaches this threshold, integrator value P will then be reset in step 7. In any other case, step 7 will be skipped.

If the clock pulse has not reached this time constant $T_R$, the integrator value P will be compared with a trigger threshold $K_3$ in step 8, and, if necessary, the safety devices within the vehicle will be triggered (compare step 9). If trigger threshold K3 has not yet been reached, clock pulse T will be set to T+1, and the current vector V will become vector $V_0$ (compare step 10) before restarting again at step 3.

The evaluation process described by means of FIGS. 7 and 8 has the disadvantage that all direction information supplied by the sensors S1 and S2 will be lost.

Figure 9:
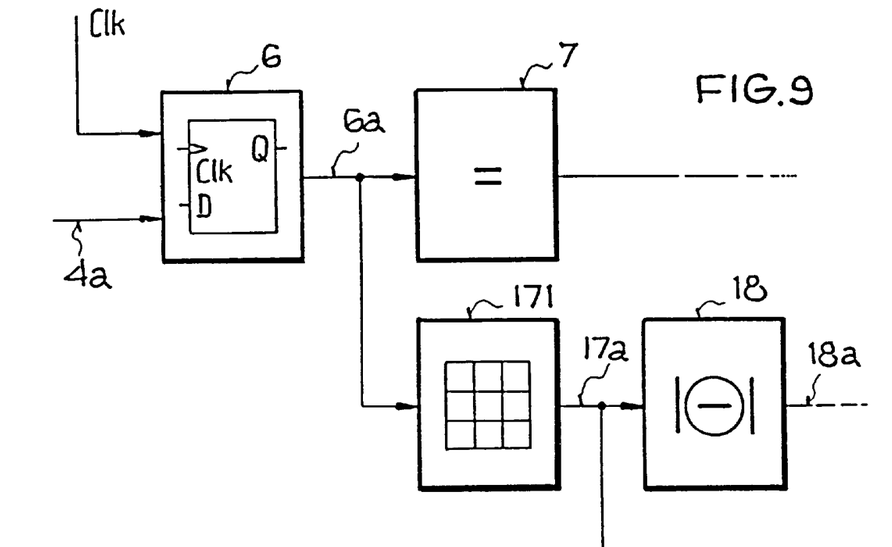
Figure 10A:
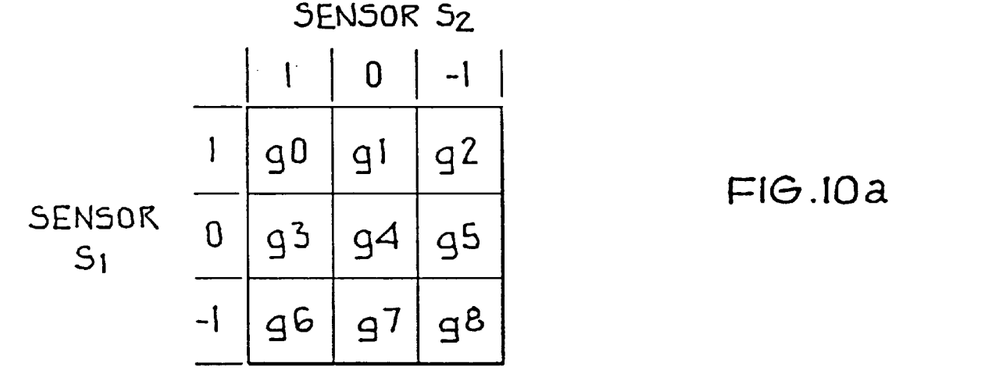
Figure 10B:
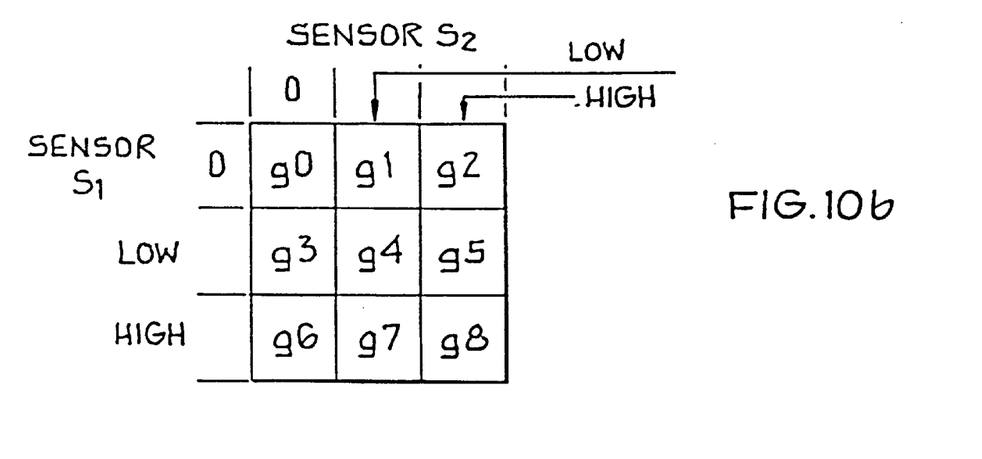

An evaluation of such direction information can be implemented by using an evaluation matrix according to FIG. 9 instead of the evaluation function "addition", with only a section of the circuit layout according to FIG. 7 being shown. Instead of the adding stage 17 known from FIG. 7, a parameter matrix is connected in this FIG. 9 as a RAM matrix 171 between the intermediate storage device 6 and function unit 18 whose functions have already been described in connection with FIG. 7. FIGS. 10a and 10b, respectively show an associated evaluation matrix.

According to the embodiment shown in FIG. 10a, the quantified sensor values of sensors S1 and S2 are each allocated a parameter gi (i=0 . . . 8). Here, the quantified sensor values 0, 1, and −1 represent the information "no acceleration", "positive acceleration", or "negative acceleration". Thus the gi values are applied as 3 bit vectors V at the output of RAM matrix 171 these 3 bit vectors V will then be processed in a fashion corresponding to that used for the vectors V according to FIG. 7. It has been found here that an accuracy of 3 bit for a gi value is sufficient; each individual value can thus lie between −3 and 3. The optimum layout of RAM matrix 171 depends on the respective vehicle signature and must be made consistent with the relevant vehicle by means of crash data. In addition to the 100% classification, such an evaluation of direction information also improves the behavior in time as related to activation in the event of a crash.

A further improvement of the behavior in time is achieved by means of the evaluation matrix according to FIG. 10b, where quantification of the sensor signals is not effected by means of a positive and negative threshold Sn and Sp, but where both switching thresholds are positive and quantification is effected using a high and a low threshold, that is, where high or low acceleration becomes detectable.

A software implementation is possible even when using such an evaluation matrix as an evaluation function and essentially corresponds to the program flow chart according to FIG. 8, the difference being that the vector is not calculated by adding the quantified sensor values but can be taken from the evaluation matrix.

The process according to the invention, combined with the evaluation process described by means of FIGS. 7, 8, and 9, can be made consistent such that, in addition to a 100% classification, an optimum behavior, that is a fast trigger response in the event of a crash, is ensured whilst the requirements for implementation do not involve major costs or effort: in particular, only a 4 bit resolution of the sensor signals or the data derived from these will already be quite sufficient for the digital processing involved.

What is claimed is:

1. A process for triggering a passive safety device for vehicle occupants inside a vehicle where—by means of electric sensors that detect a critical vehicle condition, an evaluation circuit, and a triggering agent—an activation of these triggering agents is effected in relation to the acceleration signals generated by the sensors, wherein the following process steps are involved:

a) quantification of the acceleration signals of a sensor by comparing the values of these acceleration signals with threshold values at the clock pulse of a specified first time pattern, b) detection of those acceleration signals whose associated quantified sensor signals simultaneously indicate an impact direction against the direction of vehicle travel, c) generation of a linearly increasing crash signal if in successive clock pulses the acceleration signals indicate an impact direction against the direction of vehicle travel, d) generation of a trigger threshold ($K_1$+R), increasing with the clock pulse of a second time pattern, at the point in time when the crash signal starts increasing linearly, and e) activation of trigger agents if the value of the crash signal reaches the trigger threshold ($K_1$+R).

2. Process according to claim 1 wherein the trigger threshold ($K_1$+R) increases exponentially.

3. Process according to claim 2 wherein the trigger threshold ($K_1$+R) is calculated additively from a constant value ($K_1$) and a counting value (R) increasing with the clock pulse of the second time pattern.

4. Process according to claim 3 wherein the clock pulse (clk1) of the second time pattern and the constant value ($K_1$) of the trigger threshold (K1+R) are determined in relation to the vehicle signature.

5. Process according to claim 4 wherein the quantified sensor signals are placed in intermediate storage, i.e. buffered.

6. Process according to claim 3 wherein the following process steps are involved:

a) generation of sensor characteristics from the quantified sensor signals by means of an evaluation function, b) differentiation of the sensor characteristics, c) calculation of the amounts of the differentiated sensor characteristics, d) integration of the amounts of the differentiated sensor characteristics, and e) activation of the trigger agents, if the integration value (P) reaches a trigger threshold ($K_3$).

7. Process according to claim 6 wherein an addition of the quantified sensor signals is implemented as an evaluation function.

8. Process according to claim 7 wherein a positive and a negative threshold are used for the quantification of sensor signals.

9. Process according to claim 6 wherein an evaluation matrix is provided as an evaluation function, and wherein a matrix value is allocated to the quantified sensor signals generated with each clock pulse.

10. Process according to claim 1 wherein a positive and a negative threshold are used for the quantification of sensor signals.

11. A device for implementing the process according to claim 1 wherein:

a) two sensors are provided which are arranged within the vehicle such that their sensitivity axes are directed at an angle of +45° or −45° against the longitudinal axis of the vehicle in the direction of travel, b) for quantifying the sensor signals two quantification comparators are respectively provided for the sensors, having a positive and a negative threshold value, and c) for detection of the acceleration signals indicating the impact direction orientated against the direction of vehicle travel, a comparator is used which generates an output signal if the quantified sensor signals of a clock pulse simultaneously feature positive signs.

12. Device according to claim 11 wherein, for generating the crash signal, a counter stage is post-connected to the comparator.

13. Device according to claim 12 which, for generating the increasing trigger threshold ($K_1+R$), features a function unit operating as a shift register or counter stage, and wherein the shift pulse (clk1) of such a function unit is generated as a second time pattern by a divider stage, and wherein an adding stage is post-connected to this function unit for generating the trigger threshold ($K_1+R$).

* * * * *